(12) United States Patent
Sugiyama et al.

(10) Patent No.: US 6,645,051 B2
(45) Date of Patent: Nov. 11, 2003

(54) POLISHING COMPOSITION AND POLISHING METHOD FOR POLISHING A SUBSTRATE TO BE USED FOR A MEMORY HARD DISK EMPLOYING IT

(75) Inventors: Hiroyasu Sugiyama, Aichi (JP); Tomoaki Ishibashi, Aichi (JP); Toshiyuki Takahashi, Aichi (JP)

(73) Assignee: Fujimi Incorporated, Nishikasugai-gun (JP)

( * ) Notice: Subject to any disclaimer, the term of this patent is extended or adjusted under 35 U.S.C. 154(b) by 100 days.

(21) Appl. No.: 09/986,002

(22) Filed: Nov. 7, 2001

(65) Prior Publication Data

US 2002/0102923 A1 Aug. 1, 2002

(30) Foreign Application Priority Data

Nov. 29, 2000 (JP) ........................................ 2000-362739

(51) Int. Cl.$^7$ .................................................. C09K 3/14
(52) U.S. Cl. .............................. 451/41; 451/36; 451/60; 51/307; 252/79.1; 252/79.5; 510/165; 438/692; 106/3
(58) Field of Search .............................. 451/28, 36, 41, 451/60; 51/307–309; 252/79.1, 79.2, 79.4, 79.5; 106/3; 510/165, 167, 175, 397; 438/692, 693

(56) References Cited

U.S. PATENT DOCUMENTS

| | | | | |
|---|---|---|---|---|
| 4,915,710 A | * | 4/1990 | Miyazaki et al. | ............... 51/309 |
| 4,929,257 A | * | 5/1990 | Miyazaki et al. | ............... 51/309 |
| 6,117,220 A | | 9/2000 | Kodama et al. | |
| 6,193,790 B1 | | 2/2001 | Tani | |
| 6,423,125 B1 | | 7/2002 | Ishibashi et al. | |
| 6,454,821 B1 | * | 9/2002 | Abbasi et al. | ................ 51/309 |
| 6,461,958 B1 | * | 10/2002 | Zhang et al. | ............... 438/626 |
| 6,475,407 B2 | * | 11/2002 | Ono | ........................... 252/79.1 |
| 6,475,599 B1 | * | 11/2002 | Saito et al. | ................... 428/141 |
| 6,478,835 B2 | * | 11/2002 | Miyata et al. | ................. 51/308 |
| 6,478,837 B1 | * | 11/2002 | Miyata | ......................... 51/309 |
| 6,488,729 B1 | * | 12/2002 | Ishitobi et al. | ................ 51/307 |
| 6,508,952 B1 | * | 1/2003 | Lee et al. | .................. 252/79.1 |

FOREIGN PATENT DOCUMENTS

JP 2001-003081 1/2001

\* cited by examiner

*Primary Examiner*—Joseph J. Hail, III
*Assistant Examiner*—Anthony Ojini
(74) *Attorney, Agent, or Firm*—Oblon, Spivak, McClelland, Maier & Neustadt, P.C.

(57) ABSTRACT

A polishing composition for a substrate to be used for a memory hard disk, which comprises the following components (a) to (d):

(a) water,
(b) at least one compound selected from the group consisting of a polyoxyethylene polyoxypropylene alkyl ether and a polyoxyethylene polyoxypropylene copolymer,
(c) at least one compound selected from the group consisting of nitric acid, nitrous acid, sulfuric acid, hydrochloric acid, molybdic acid, sulfamic acid, glycine, glyceric acid, mandelic acid, malonic acid, ascorbic acid, glutamic acid, glyoxylic acid, malic acid, glycolic acid, lactic acid, gluconic acid, succinic acid, tartaric acid, maleic acid and citric acid, and their salts, and
(d) at least one abrasive selected from the group consisting of aluminum oxide, silicon dioxide, cerium oxide, zirconium oxide, titanium oxide, silicon nitride and silicon carbide.

6 Claims, 1 Drawing Sheet

MicroXAM

|         | $X_0$ (mm) | $X_1$ (mm) | $X_2$ (mm) |
|---------|------------|------------|------------|
| Dub-Off | 4.00       | 4.00       | 0.35       |
| Roll-Off| -          | 1.60       | 0.76       |

POLISHING COMPOSITION AND POLISHING METHOD FOR POLISHING A SUBSTRATE TO BE USED FOR A MEMORY HARD DISK EMPLOYING IT

BACKGROUND OF THE INVENTION

1. Field of the Invention

The present invention relates to a polishing composition useful for polishing the surface of a substrate for a magnetic disk to be used for a memory hard disk, i.e. a memory device useful for e.g. a computer, and a polishing method employing it.

More particularly, the present invention relates to a polishing composition and a polishing method employing it, in polishing of a disk substrate (hereinafter referred to as substrate) to be used for a memory hard disk represented by e.g. a Ni—P disk, a Ni—Fe disk, an aluminum disk, a glass disk, a boron carbide disk or a carbon disk, whereby polishing can be carried out without increasing edge sagging at the periphery portion (hereinafter referred to as "edge portion") as compared with a substrate polished by a conventional polishing composition, and a magnetic disk device having a higher capacity and a higher memory density can be produced.

2. Discussion of Background

There have been continuing efforts for miniaturization, larger capacity and lower price for memory hard disks to be used for a magnetic disk device, which are one of memory media for e.g. computers. One of substrates which are most widely used at present, is one having an electroless Ni—P plating film formed on a blank material. The blank material is one obtained by fairing an aluminum or another base plate as a base of the substrate by processing by diamond turning, lapping by means of a PVA grind stone prepared by fixing SiC grinding material or other methods, for the purpose of parallelization or planarization. However, by such various fairing methods, a relatively large waviness can not completely be removed. And, the electroless Ni—P plating film will be formed along the waviness on the blank material. Accordingly, such a waviness will remain also on the substrate in some cases. Accordingly, for the purpose of removing the waviness of the substrate and making the surface smooth and flat, surface polishing is carried out.

Along with the increase in the capacity of memory hard disks, the surface storage density is increasing at a rate of a few tens percent per year. Accordingly, the space on a memory hard disk occupied by a predetermined amount of recorded information, is lower than ever, and the magnetic force required for storage tends to be weak. Accordingly, recently, it is required to minimize a flying height of the head, which is a space between the magnetic head and the memory hard disk, in a magnetic disk device in recent years.

Further, so-called texturing may sometimes be carried out to impart concentric circular scorelines to the substrate after polishing, for the purposes of preventing sticking of the magnetic head for reading or writing information, to the memory hard disk and preventing non-uniformity of the magnetic field on the memory hard disk due to scorelines in a certain direction different from the rotational direction of the memory hard disk, formed on the substrate surface by polishing.

Recently, for the purpose of further reducing the flying height of the head, light texturing is carried out wherein the scorelines formed on the substrate are further reduced, or a non-texture substrate free from scorelines, is employed which is not subjected to texturing. The technology to support such a low flying height of the magnetic head has also been developed, and the reduction of the flying height of the head is being increasingly advanced. Accordingly, the flying height of the head is reduced to a level of not higher than 0.02 $\mu$m.

A magnetic head flies along the shape on the surface of a memory hard disk which rotates at an extremely high speed, and if a pit at a level of several $\mu$m is present on a memory hard disk surface, it is likely that information can not completely be written in, thus leading to a defect of information so-called a "bit defect" or failure in reading the information, which causes an error.

Here, the "pits" are dents which are originally present on the substrate, or dents formed by polishing on the surface of the substrate, and fine pits are dents having a diameter of less than about 50 $\mu$m, among them.

Accordingly, it is important to minimize the roughness of the substrate surface in the step prior to forming a magnetic medium, i.e. polishing step, and at the same time, it is necessary to remove microprotrusions, fine pits and other surface defects effectively with a high efficiency.

For such a purpose, it used to be common to carry out polishing by means of a polishing composition comprising aluminum oxide or other various abrasives and water as well as various polishing accelerators. For example, JP-A-61-278587 and JP-A-62-25187 disclose a polishing composition for a memory hard disk, obtained by adding e.g. aluminum nitrate, nickel nitrate or nickel sulfate as a polishing accelerator to water and aluminum hydroxide, followed by mixing to obtain a slurry.

Further, JP-A-2-84485 discloses an acidic polishing composition for an aluminum magnetic disk which comprises water and an alumina abrasive powder as well as gluconic acid or lactic acid as a polishing accelerator and colloidal alumina as a surface modifier, JP-A-7-133477 discloses an aqueous polishing composition comprising an alumina abrasive, colloidal alumina and an alkali nitrite, and JP-A-9-316430 discloses a polishing composition for a magnetic disk substrate which comprises water, α-alumina and a polishing accelerator, wherein the polishing accelerator is aluminum oxalate.

However, in the case where a substrate is polished by means of the above-mentioned conventional polishing composition, the edge portion of the substrate is more significantly polished than the flat surface during the polishing, thus causing edge sagging at the periphery portion on the substrate. On a substrate having sagging at the edge portion, it is impossible to store data on said edge portion, whereby data storage region decreases.

Accordingly, in production of a magnetic disk device having a high capacity and a high storage density, the edge sagging at the edge portion is problematic, and it is desired to increase storage capacity by reducing the edge sagging so that the edge portion can effectively be used to further increase the storage area.

It is found that the edge sagging is significantly influenced by the polishing composition as well as polishing conditions during the polishing. Accordingly, a polishing composition has been desired with which a magnetic disk device having a high capacity and a high storage density can be obtained without increasing the edge sagging at the edge portion during the polishing.

Here, for evaluation of the edge sagging, the shape of the edge portion at which edge sagging is formed and the depth (sagging width) are obtained, and basically two measured values are employed. Namely, the edge sagging is evaluated by two measured values Roll-Off and Dub-Off as mentioned hereinafter in many cases. However, although the object to be measured is the same with respect to the two measured values, the method for measuring the shape and the standard value as the tolerance limit in the measuring method based on the measured value are not generally determined substantially, depending on difference in characteristics of measuring apparatus to be used, and the standard value is dependent on judgment by an individual manufacturer in many cases.

SUMMARY OF THE INVENTION

It is an object of the present invention to solve the above-mentioned problems, and to provide a polishing composition and a polishing method employing it, with which a magnetic disk device having a high capacity and a high storage density can be obtained without increasing edge sagging as compared with a conventional polishing composition, in polishing of a substrate to be used for a memory hard disk.

The present invention provides a polishing composition which comprises the following components:
(a) water,
(b) at least one compound selected from the group consisting of a polyoxyethylene polyoxypropylene alkyl ether and a polyoxyethylene polyoxypropylene copolymer,
(c) at least one compound selected from the group consisting of nitric acid, nitrous acid, sulfuric acid, hydrochloric acid, molybdic acid, sulfamic acid, glycine, glyceric acid, mandelic acid, malonic acid, ascorbic acid, glutamic acid, glyoxylic acid, malic acid, glycolic acid, lactic acid, gluconic acid, succinic acid, tartaric acid, maleic acid and citric acid, and their salts, and
(d) at least one abrasive selected from the group consisting of aluminum oxide, silicon dioxide, cerium oxide, zirconium oxide, titanium oxide, silicon nitride and silicon carbide.

The present invention further provides the polishing composition, wherein the component (c) is at least one member selected from the group consisting of aluminum nitrate, nickel nitrate, lithium nitrate, sodium nitrate, potassium nitrate, iron (III) nitrate, sodium nitrite, potassium nitrite, aluminum sulfate, nickel sulfate, lithium sulfate, sodium sulfate, iron (III) sulfate, ammonium sulfate, aluminum chloride, iron (III) chloride, ammonium chloride, sodium molybdate, ammonium molybdate, nickel sulfamate and ammonium sulfamate.

The present invention further provides the polishing composition, wherein the component (c) is at least one member selected from the group consisting of glycine, glyceric acid, mandelic acid, malonic acid, ascorbic acid, glutamic acid, glyoxylic acid, malic acid, glycolic acid, lactic acid, gluconic acid, succinic acid, tartaric acid, maleic acid and citric acid.

The present invention further provides a polishing method by means of a polishing composition comprising the following components:
(a) water,
(b) at least one compound selected from the group consisting of a polyoxyethylene polyoxypropylene alkyl ether and a polyoxyethylene polyoxypropylene copolymer,
(c) at least one compound selected from the group consisting of nitric acid, nitrous acid, sulfuric acid, hydrochloric acid, molybdic acid, sulfamic acid, glycine, glyceric acid, mandelic acid, malonic acid, ascorbic acid, glutamic acid, glyoxylic acid, malic acid, glycolic acid, lactic acid, gluconic acid, succinic acid, tartaric acid, maleic acid and citric acid, and their salts, and
(d) at least one abrasive selected from the group consisting of aluminum oxide, silicon dioxide, cerium oxide, zirconium oxide, titanium oxide, silicon nitride and silicon carbide.

The present invention further provides the polishing method by means of a polishing composition, wherein the component (c) is at least one member selected from the group consisting of aluminum nitrate, nickel nitrate, lithium nitrate, sodium nitrate, potassium nitrate, iron (III) nitrate, sodium nitrite, potassium nitrite, aluminum sulfate, nickel sulfate, lithium sulfate, sodium sulfate, iron (III) sulfate, ammonium sulfate, aluminum chloride, iron (III) chloride, ammonium chloride, sodium molybdate, ammonium molybdate, nickel sulfamate and ammonium sulfamate.

The present invention further provides the polishing method by means of a polishing composition, wherein the component (c) is at least one member selected from the group consisting of glycine, glyceric acid, mandelic acid, malonic acid, ascorbic acid, glutamic acid, glyoxylic acid, malic acid, glycolic acid, lactic acid, gluconic acid, succinic acid, tartaric acid, maleic acid and citric acid.

DETAILED DESCRIPTION OF THE PREFERRED EMBODIMENTS

Figure 1:
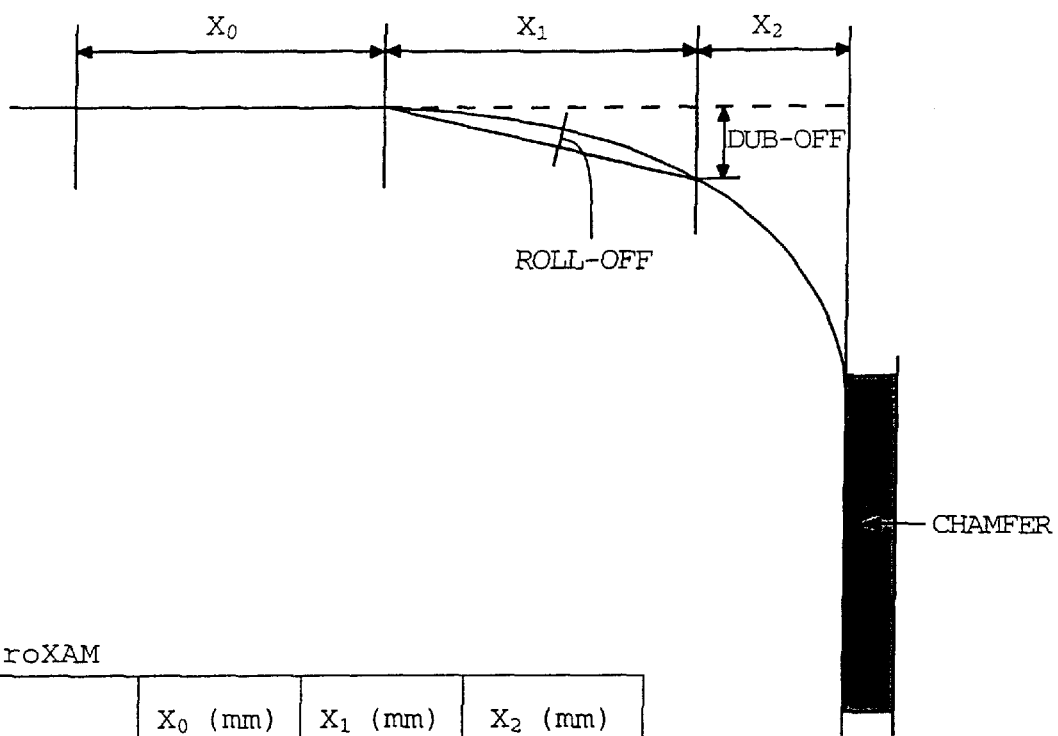
FIG. 1 is a diagram illustrating measurement positions to evaluate edge sagging at the substrate edge portion.

The polishing composition of the present invention is characterized by containing as the compound (b) at least one compound selected from the group consisting of a polyoxyethylene polyoxypropylene alkyl ether and a polyoxyethylene polyoxypropylene copolymer. The polyoxyethylene polyoxypropylene alkyl ether has the following structural formula, and is obtained by addition-polymerization of propylene oxide and ethylene oxide with a linear or branched higher alcohol.

Polyoxyethylene Polyoxypropylene Alkyl Ether

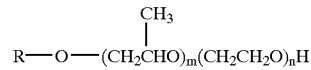

wherein R is an alkyl group and m and n are integers indicating the number of mols of propylene glycol and ethylene glycol added, respectively.

The polyoxyethylene polyoxypropylene copolymers are classified into the following block type and random type.

The polyoxyethylene polyoxypropylene block copolymer has a structure as represented by the following structural formula, and is obtained by addition-polymerizing of ethylene oxide as a hydrophilic group to each end of polypropylene glycol obtained by polymerization of propylene oxide as a lopophilic group, or by addition-polymerizing polypropylene glycol to each end of polyethylene glycol obtained by polymerization of ethylene oxide. Further, the polyoxyethylene polyoxypropylene random copolymer is obtained by addition-polymerizing ethylene oxide and propylene oxide randomly. Further, it is possible to use a plural types of polyoxyethylene polyoxypropylene block copolymers or polyoxyethylene polyoxypropylene random copolymers or to use both in an optional ratio, within a range of not impairing the effect of the present invention.

Polyoxyethylene Polyoxypropylene Block Copolymer

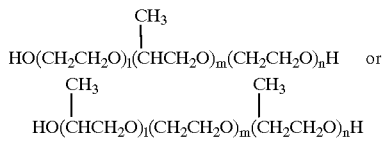

wherein each of l, m and n is an optional integer.

In the present invention, the molecular weight of the polyoxyethylene polyoxypropylene alkyl ether and polyoxyethylene polyoxypropylene copolymer is not particularly limited, but preferred is a compound having an average molecular weight of from 1,500 to 100,000, more preferably from 1,500 to 20,000. Further, since no effect can be obtained only by a hydrophilic group or a hydrophobic group in its molecule, the balance of number of mols of hydrophilic group (ethylene oxide) or hydrophobic group added to the polyoxyethylene polyoxypropylene alkyl ether or polyoxyethylene polyoxypropylene copolymer is important, and the addition amount (%) of the hydrophilic group in its molecule is preferably from 10% to 80%. The polyoxyethylene polyoxypropylene alkyl ether may have an optional alkyl group within a range of not impairing the effect of the present invention.

In the present invention, the content of the polyoxyethylene polyoxypropylene alkyl ether and the polyoxyethylene polyoxypropylene copolymer is preferably from 0.001 to 2 wt %, more preferably from 0.005 to 1 wt % based on the total weight of the polishing composition. By its incorporation, Roll-Off and Dub-Off properties tend to be improved, but no adequate effect can be expected with a too small addition amount, and there is fear that the stock removal rate tends to decrease if its amount is excessively increased.

Further, it is required that the polyoxyethylene polyoxypropylene alkyl ether and the polyoxyethylene polyoxypropylene copolymer are dissolved in the composition. Further, it is possible to use a plural types of polyoxyethylene polyoxypropylene alkyl ethers or polyoxyethylene polyoxypropylene copolymers or to use both in an optional ratio within a range of not impairing the effect of the present invention.

The polishing composition of the present invention contains as the compound (c) at least one compound selected from the group consisting of nitric acid, nitrous acid, sulfuric acid, hydrochloric acid, molybdic acid, sulfamic acid, glycine, glyceric acid, mandelic acid, malonic acid, ascorbic acid, glutamic acid, glyoxylic acid, malic acid, glycolic acid, lactic acid, gluconic acid, succinic acid, tartaric acid, maleic acid and citric acid, and their salts and derivatives (hereinafter referred to as "acid compound").

Specifically, the salt of an acid compound is selected from the group consisting of aluminum nitrate, nickel nitrate, lithium nitrate, sodium nitrate, potassium nitrate, iron (III) nitrate, sodium nitrite, potassium nitrite, aluminum sulfate, nickel sulfate, lithium sulfate, sodium sulfate, iron (III) sulfate, ammonium sulfate, aluminum chloride, iron (III) chloride, ammonium chloride, sodium molybdate, ammonium molybdate, nickel sulfamate and ammonium sulfamate.

Further, in the present invention, preferred acid compound is an organic acid, and specifically, glycine, glyceric acid, mandelic acid, malonic acid, ascorbic acid, glutamic acid, glyoxylic acid, malic acid, glycolic acid, lactic acid, gluconic acid, succinic acid, tartaric acid, maleic acid and citric acid may be mentioned. The reason why an organic acid is preferred as the acid compound is that clogging of a pad tends to be little during polishing as compared with an inorganic acid, and it is suitably used as an acid compound.

Such an acid compound should be dissolved in the composition. Further, a plurality of these acid compounds may be used together in an optional ratio within a range of not impairing the effect of the present invention.

The suitable addition amount of the acid compound in the polishing composition of the present invention varies depending upon the type of the acid compound to be used, but is preferably from 0.01 to 25 wt %, more preferably from 0.1 to 20 wt %, furthermore preferably from 0.2 to 10 wt %, based on the total weight of the polishing composition. By increasing the addition amount of the acid compound, the stock removal rate tends to be high, but if the amount is excessively large, chemical effect of the polishing composition tends to be significant, and microprotrusions, fine pits and other surface defects may be formed in some cases. On the other hand, if the amount is too small, the stock removal rate tends to be low, and no adequate effect of preventing formation of fine pits, microprotrusions and other surface defects may be obtained in some cases. Further, if it is added in an excessively large amount, such a tendency that the surface sagging is increased is not particularly observed.

A suitable abrasive in the polishing composition of the present invention is at least one member selected from the group consisting of aluminum oxide, silicon dioxide, cerium oxide, zirconium oxide, titanium oxide, silicon nitride and silicon carbide.

As the aluminum oxide, α-alumina, δ-alumina, θ-alumina, κ-alumina and another one having a different form may be mentioned. Further, one called fumed alumina may be mentioned in view of production method. Further, as silicon dioxide, colloidal silica, fumed silica and various ones having different properties or formed by different methods are present.

As the cerium oxide, trivalent or tetravalent one in view of valency and hexagonal system, cubic system or face-centered cubic system in view of crystal system may be mentioned. Further, as the zirconium oxide, monoclinic system, tetragonal system and amorphous one may be mentioned in view of crystal system. Further, one called fumed zirconia may be mentioned in view of production method.

As the titanium oxide, titanium monoxide, dititanium trioxide, titanium dioxide and another one may be mentioned in view of crystal system. Further, one called fumed titania may be mentioned in view of production method. Further, as the silicon nitride, α-silicon nitride, β-silicon nitride, amorphous silicon nitride and another one having a different form may be mentioned.

As the silicon carbide, α-silicon carbide, β-silicon carbide, amorphous silicon carbide and another one having a different form may be mentioned.

Here, in the polishing composition of the present invention, the above components may be optionally combined as the case requires. In the case where they are combined, the combination method and the ratio of components used are not particularly limited.

The above abrasive is to polish a surface to be polished by a mechanical action as abrasive grains. The size of the abrasive grains varies depending upon the type of the abrasive grains, the type of the surface to be treated and polishing conditions, and specification required for a substrate, and is not particularly limited, but the particle size of silicon dioxide is preferably from 0.005 to 0.5 μm, particularly preferably from 0.01 to 0.3 μm, as the average particle size obtained from the surface area measured by a BET method.

Further, the particle size of aluminum oxide, zirconium oxide, titanium oxide, silicon nitride and silicon carbide is preferably from 0.01 to 2 μm, particularly preferably from 0.05 to 1.5 μm, as the average particle size measured by means of a laser diffraction particle size analyzer LS-230 (manufactured by Coulter, U.S.A.) Further, the particle size of cerium oxide is preferably from 0.01 to 0.5 μm, particularly preferably from 0.05 to 0.45 μm, as the average particle size observed by a scanning electron microscope.

If the average particle size of such an abrasive exceeds the above range, the surface roughness of the polished surface may be significant or scratches may be formed, and due care will accordingly be required during polishing. On the other hand, if it is less than the above range, the stock removal rate tends to be extremely low, such being unpractical as a polishing composition.

The content of the abrasive in the polishing composition is usually from 0.1 to 50 wt %, preferably from 1 to 25 wt %, based on the total amount of the composition. If the content of the abrasive is too low, microprotrusions, fine pits or other surface defects tend to form, and the stock removal rate may be low in some cases. On the other hand, if the content is too high, no uniform dispersibility may be maintained, and the composition viscosity tends to be extremely high, and accordingly handling tends to be difficult.

Water to be used for the polishing composition of the present invention is not particularly limited, but preferred is one having little impurity so that the above-mentioned respective components can precisely perform there roles. Namely, water is preferably distilled water, or one having impurity ions removed by an ion exchange resin and having suspended matters removed by a filter.

Polishing Composition

The polishing composition of the present invention is prepared usually by mixing and dispersing the above-described respective components, i.e. at least one abrasive (component (d)) selected from the group consisting of aluminum oxide, silicon dioxide, cerium oxide, zirconium oxide, titanium oxide, silicon nitride and manganese dioxide in a predetermined content in water (component (a)), and further dissolving the polyoxyethylene polyoxypropylene alkyl ether or polyoxyethylene polyoxypropylene copolymer (component (b)) and the acid compound (component (c)) therein.

Further, methods for dispersing or dissolving these components in water are optional. For example, stirring by a vane-type stirrer or supersonic dispersion may be employed. Further, the order for mixing is optional, and either the dispersion of the abrasive or the dissolution of the polyoxyethylene polyoxypropylene alkyl ether or polyoxyethylene polyoxypropylene block copolymer and the acid compound may be carried out first, or both may be carried out simultaneously.

At the time of preparing the above polishing composition, various known additives may further be added for the purpose of stabilizing or maintaining the quality of the product, or depending upon the type of the object to be treated, polishing conditions or the necessity for other processing conditions.

Preferred examples of such additives are as follows.

(i) water-soluble alumina sol, (ii) organic polyanionic substances such as lignin sulfonate and polyacrylate, (iii) water-soluble high polymers (emulsifiers) such as polyvinylalcohol, (iv) chelating agents such as dimethylglyoxime, dithizone, oxine, acetylacetone, EDTA and NTA, (v) hydrogen peroxide, and (vi) bactericides such as potassium hydrogencarbonate.

However, edge sagging may be increased depending upon the addition amount or combination, and due care will accordingly be required.

The polishing composition of the present invention may be prepared and stored or transported in the form of a stock solution having a relatively high concentration, and may be used by diluting it at the time of the actual polishing treatment. The above-mentioned ranges of concentration of the respective components are concentrations at the time of actual polishing treatment. Needless to say, when a method of diluting the composition at the time of use is employed, the polishing composition will be a solution having a higher concentration in the state in which it is stored or transported. Further, from the viewpoint of the handling efficiency, it is preferred that the polishing composition is prepared in such a concentrated form.

The detailed mechanism is not clearly understood with respect to the reason why the polishing composition of the present invention does not increase the edge sagging. However, the reason why it does not increase the edge sagging at the edge portion is estimated to be because friction during polishing decreases. It has been found that polishing performance is also improved by adding the polishing composition of the present invention.

Now, the embodiments of the present invention will be described in further detail with reference to Examples and Comparative Examples. However, it should be understood that the present invention is by no means restricted to such specific embodiments.

EXAMPLES 1 TO 20 AND COMPARATIVE EXAMPLES 1 TO 7

Preparation of Polishing Compositions

First, as an abrasive, aluminum oxide having an average particle size of 0.8 μm was dispersed in water by means of a stirrer to prepare a dispersion having an abrasive concentration of 20 wt % based on the total weight of the polishing composition. Then, an aqueous organic acid or inorganic acid solution and a polyoxyethylene polyoxypropylene alkyl ether or polyoxyethylene polyoxypropylene copolymer were added thereto, to prepare the respective samples of Examples 1 to 20. Further, samples of Comparative Examples 1 to 7, having no polyoxyethylene polyoxypropylene alkyl ether or polyoxyethylene polyoxypropylene copolymer added or a glycol added thereto, were prepared.

TABLE 1

| Samples | Acid compound Type | Amount (wt %) | Additives Type | Average molecular weight | EO addition ratio (%) | Amount (wt %) |
|---|---|---|---|---|---|---|
| Ex. 1 | Malic acid | 1.0 | PEPP | 2,200 | 10 | 0.05 |
| Ex. 2 | Malic acid | 1.0 | PEPP | 2,200 | 10 | 0.1 |
| Ex. 3 | Glycolic acid | 2.0 | PEPP | 2,200 | 10 | 0.05 |
| Ex. 4 | Maleic acid | 1.0 | PEPP | 2,200 | 10 | 0.05 |
| Ex. 5 | Succinic acid | 1.0 | PEPP | 2,200 | 10 | 0.05 |
| Ex. 6 | Aluminum nitrate | 4.0 | PEPP | 2,200 | 10 | 0.05 |
| Ex. 7 | Malic acid | 1.0 | PEPP | 3,000 | 40 | 0.05 |
| Ex. 8 | Aluminum nitrate | 4.0 | PEPP | 3,000 | 40 | 0.05 |
| Ex. 9 | Malic acid | 1.0 | PEPP | 9,000 | 80 | 0.05 |
| Ex. 10 | Aluminum nitrate | 4.0 | PEPP | 9,000 | 80 | 0.05 |
| Ex. 11 | Malic acid | 1.0 | PEPR | 2,500 | 50 | 0.05 |
| Ex. 12 | Aluminum nitrate | 4.0 | PEPP | 2,500 | 50 | 0.05 |
| Ex. 13 | Malic acid | 1.0 | PEPA | 1,000 | 30 | 0.05 |
| Ex. 14 | Malic acid | 1.0 | PEPA | 1,000 | 30 | 0.1 |
| Ex. 15 | Glycolic acid | 2.0 | PEPA | 1,000 | 30 | 0.05 |
| Ex. 16 | Maleic acid | 1.0 | PEPA | 1,000 | 30 | 0.05 |
| Ex. 17 | Succinic acid | 1.0 | PEPA | 1,000 | 30 | 0.05 |
| Ex. 18 | Aluminum nitrate | 4.0 | PEPA | 1,000 | 30 | 0.05 |
| Ex. 19 | Malic acid | 1.0 | PEPA | 2,000 | 50 | 0.05 |
| Ex. 20 | Aluminum nitrate | 4.0 | PEPA | 2,000 | 50 | 0.05 |
| Comp. Ex. 1 | Malic acid | 1.0 | No additive | — | — | — |
| Comp. Ex. 2 | Glycolic acid | 2.0 | No additive | — | — | — |
| Comp. Ex. 3 | Maleic acid | 1.0 | No additive | — | — | — |
| Comp. Ex. 4 | Succinic acid | 1.0 | No additive | — | — | — |
| Comp. Ex. 5 | Aluminum nitrate | 4.0 | No additive | — | — | — |
| Comp. Ex. 6 | Malic acid | 1.0 | PG | — | — | 0.05 |
| Comp. Ex. 7 | Malic acid | 1.0 | DPG | — | — | 0.05 |

PEPP: Polyoxyethylene polyoxypropylene block copolymer
PEPR: Polyoxyethylene polyoxypropylene random copolymer
PEPA: Polyoxyethylene polyoxypropylene alkyl ether
PG: Propylene glycol
DPG: Dipropylene glycol Polishing Test Then, using the respective polishing compositions, polishing test was carried out using a substrate. Conditions were as follows.

Polishing Conditions

Object to be polished: 3.5 inch electroless Ni—P plating substrate

Number of objects: 15 plates

Polishing machine: double-side polishing machine (platen diameter 700 mm)

Polishing pad: Kanebo 0048 (manufactured by Kanebo, Ltd.)

Treating pressure: 100 g/cm$^2$

Upper platen rotational speed: 24 rpm

Lower platen rotational speed: 16 rpm

Composition dilution ratio: 1:3 pure water

Supply rate of the polishing composition: 150 cc/min

Amount to be treated: 3 μm as a machining allowance (double side)

(Polishing time was set so that the machining allowance would be constant by carrying out a preliminary test)

Method for Evaluating Edge Sagging

The shape of the edge sagging at the substrate edge was measured at positions in FIG. 1 and evaluated by means of microXAM (manufactured by PhaseSift). Here, FIG. 1 is a cross-sectional view illustrating edge portion of a substrate, and horizontal direction (X axis) indicates a substrate surface diameter axis and the vertical direction illustrates a substrate thickness direction. With respect to the measuring method regarding Roll-Off and Dub-Off, the measurement position and the measurement method are not commonly determined and optionally specified by an individual manufacturer. In the present invention, the present inventors evaluated the edge sagging by evaluating measurement points as illustrated in FIG. 1. Here, the present method is appropriate and usually employed in a case of evaluating the edge sagging at the substrate edge portion.

After the polishing, the substrates were washed and dried, whereupon the weight reduction of each substrate by polishing was measured, and the obtained values were divided by the respective polishing times which were preliminarily set to obtain the stock removal rates.

Evaluation standards for the edge sagging (Roll-Off, Dub-Off) of the polishing compositions are as follows. Namely, the value of a composition having no polyoxyethylene polyoxypropylene alkyl ether or polyoxyethylene polyoxypropylene copolymer incorporated (Comparative Example 1) was taken as the standard value $H_O$, and measured values $H_R$ and $H_D$ of Roll-Off and Dub-Off, respectively, were compared with the standard value $H_O$ to obtain the improvement effect A (%) from the following formula:

$$A(\%) = [1 - (H_R, H_D)/H_O] \times 100$$

A: Improvement effect (%)
$H_R$, $H_D$: Measured values

H$_O$: Standard value (measured value in Comparative Example 1)

The improvement effect A was evaluated by the following evaluation standards, and the evaluation results are shown in Table 2.

◯: Improvement effect of at least 20%
△: Improvement effect of from 10% to lass than 20%
X: Improvement effect of less than 10%

TABLE 2

| | Stock removal rate (μm/min) | Edge Roll-Off | Dub-Off |
|---|---|---|---|
| Ex. 1 | 0.57 | ◯ | ◯ |
| Ex. 2 | 0.55 | ◯ | ◯ |
| Ex. 3 | 0.54 | ◯ | ◯ |
| Ex. 4 | 0.55 | ◯ | ◯ |
| Ex. 5 | 0.56 | ◯ | ◯ |
| Ex. 6 | 0.63 | ◯ | ◯ |
| Ex. 7 | 0.54 | ◯ | ◯ |
| Ex. 8 | 0.64 | ◯ | ◯ |
| Ex. 9 | 0.55 | ◯ | ◯ |
| Ex. 10 | 0.61 | ◯ | ◯ |
| Ex. 11 | 0.53 | ◯ | ◯ |
| Ex. 12 | 0.62 | ◯ | ◯ |
| Ex. 13 | 0.58 | ◯ | ◯ |
| Ex. 14 | 0.60 | ◯ | ◯ |
| Ex. 15 | 0.59 | ◯ | ◯ |
| Ex. 16 | 0.59 | ◯ | ◯ |
| Ex. 17 | 0.58 | ◯ | ◯ |
| Ex. 18 | 0.63 | ◯ | ◯ |
| Ex. 19 | 0.58 | ◯ | ◯ |
| Ex. 20 | 0.63 | ◯ | ◯ |
| Comp. Ex. 1 | 0.63 | X | X |
| Comp. Ex. 2 | 0.60 | X | X |
| Comp. Ex. 3 | 0.63 | X | X |
| Comp. Ex. 4 | 0.64 | X | X |
| Comp. Ex. 5 | 0.69 | X | X |
| Comp. Ex. 6 | 0.60 | X | X |
| Comp. Ex. 7 | 0.61 | X | X |

It is found from the results shown in Table 2 that the polishing compositions of the present invention obtained in Examples 1 to 20 has a higher effect of improving Roll-Off and Dub-Off as compared with a conventional polishing composition which is a composition containing no polyoxyethylene polyoxypropylene alkyl ether or polyoxyethylene polyoxypropylene copolymer (Comparative Examples 1 to 5) or having a glycol added thereto (Comparative Examples 6 and 7), and they effectively prevent edge sagging of a substrate.

The polishing composition of the present invention does not increase the edge sagging as compared with a conventional polishing composition in polishing of a substrate to be used for a memory hard disk. Further, according to the polishing method of a memory hard disk of the present invention, a memory hard disk having a higher capacity and a higher storage density can be produced without increasing the edge sagging as compared with a case of using a conventional polishing composition.

Namely, polishing of a substrate with less edge sagging as compared with a conventional polishing composition becomes possible according to a polishing composition which comprises the following components (a) water, (b) at least one compound selected from the group consisting of a polyoxyethylene polyoxypropylene alkyl ether and a polyoxyethylene polyoxypropylene copolymer, (c) at least one compound selected from the group consisting of nitric acid, nitrous acid, sulfuric acid, hydrochloric acid, molybdic acid, sulfamic acid, glycine, glyceric acid, mandelic acid, malonic acid, ascorbic acid, glutamic acid, glyoxylic acid, malic acid, glycolic acid, lactic acid, gluconic acid, succinic acid, tartaric acid, maleic acid and citric acid, and their salts, and (d) at least one abrasive selected from the group consisting of aluminum oxide, silicon dioxide, cerium oxide, zirconium oxide, titanium oxide, silicon nitride and silicon carbide.

According to the above polishing composition wherein the component (c) is at least one member selected from the group consisting of aluminum nitrate, nickel nitrate, lithium nitrate, sodium nitrate, potassium nitrate, iron (III) nitrate, sodium nitrite, potassium nitrite, aluminum sulfate, nickel sulfate, lithium sulfate, sodium sulfate, iron (III) sulfate, ammonium sulfate, aluminum chloride, iron (III) chloride, ammonium chloride, sodium molybdate, ammonium molybdate, nickel sulfamate and ammonium sulfamate, polishing of a substrate with an extremely little edge sagging becomes possible.

Further, according to the above polishing composition wherein the component (c) is at least one member selected from the group consisting of glycine, glyceric acid, mandelic acid, malonic acid, ascorbic acid, glutamic acid, glyoxylic acid, malic acid, glycolic acid, lactic acid, gluconic acid, succinic acid, tartaric acid, maleic acid and citric acid, polishing of a substrate with an extremely little edge sagging becomes possible in easier handling.

Further, Roll-Off and Dub-Off properties of a memory hard disk can be improved according to a polishing method by means of a polishing composition comprising the following components (a) water, (b) at least one compound selected from the group consisting of a polyoxyethylene polyoxypropylene alkyl ether and a polyoxyethylene polyoxypropylene copolymer, (c) at least one compound selected from the group consisting of nitric acid, nitrous acid, sulfuric acid, hydrochloric acid, molybdic acid, sulfamic acid, glycine, glyceric acid, mandelic acid, malonic acid, ascorbic acid, glutamic acid, glyoxylic acid, malic acid, glycolic acid, lactic acid, gluconic acid, succinic acid, tartaric acid, maleic acid and citric acid, and their salts, and (d) at least one abrasive selected from the group consisting of aluminum oxide, silicon dioxide, cerium oxide, zirconium oxide, titanium oxide, silicon nitride and silicon carbide.

Further, Roll-Off and Dub-Off performances can be greatly improved by the above polishing method wherein the component (c) is at least one member selected from the group consisting of aluminum nitrate, nickel nitrate, lithium nitrate, sodium nitrate, potassium nitrate, iron (III) nitrate, sodium nitrite, potassium nitrite, aluminum sulfate, nickel sulfate, lithium sulfate, sodium sulfate, iron (III) sulfate, ammonium sulfate, aluminum chloride, iron (III) chloride, ammonium chloride, sodium molybdate, ammonium molybdate, nickel sulfamate and ammonium sulfamate.

Further, clogging of a pad can be prevented during polishing of a substrate, handling becomes easy, and Roll-Off and Dub-Off performances can be greatly improved, according to the above polishing method wherein the component (c) is at least one member selected from the group consisting of glycine, glyceric acid, mandelic acid, malonic acid, ascorbic acid, glutamic acid, glyoxylic acid, malic acid, glycolic acid, lactic acid, gluconic acid, succinic acid, tartaric acid, maleic acid and citric acid.

The entire disclosure of Japanese Patent Application No. 2000-362739 filed on Nov. 29, 2000 including specification, claims, drawings and summary are incorporated herein by reference in its entirety.

What is claimed is:

1. A polishing composition for a substrate to be used for a memory hard disk, which comprises the following components (a) to (d):

(a) water, (b) at least one compound selected from the group consisting of a polyoxyethylene polyoxypropylene alkyl ether and a polyoxyethylene polyoxypropylene copolymer, (c) at least one compound selected from the group consisting of nitric acid, nitrous acid, sulfuric acid, hydrochloric acid, molybdic acid, sulfamic acid, glycine, glyceric acid, mandelic acid, malonic acid, ascorbic acid, glutamic acid, glyoxylic acid, malic acid, glycolic acid, lactic acid, gluconic acid, succinic acid, tartaric acid, maleic acid and citric acid, and their salts, and (d) at least one abrasive selected from the group consisting of aluminum oxide, silicon dioxide, cerium oxide, zirconium oxide, titanium oxide, silicon nitride and silicon carbide.

2. The polishing composition according to claim 1, wherein the component (c) is at least one member selected from the group consisting of aluminum nitrate, nickel nitrate, lithium nitrate, sodium nitrate, potassium nitrate, iron (III) nitrate, sodium nitrite, potassium nitrite, aluminum sulfate, nickel sulfate, lithium sulfate, sodium sulfate, iron (III) sulfate, ammonium sulfate, aluminum chloride, iron (III) chloride, ammonium chloride, sodium molybdate, ammonium molybdate, nickel sulfamate and ammonium sulfamate.

3. The polishing composition according to claim 1, wherein the component (c) is at least one member selected from the group consisting of glycine, glyceric acid, mandelic acid, malonic acid, ascorbic acid, glutamic acid, glyoxylic acid, malic acid, glycolic acid, lactic acid, gluconic acid, succinic acid, tartaric acid, maleic acid and citric acid.

4. A polishing method for polishing a substrate to be used for a memory hard disk, by means of a polishing composition comprising the following components (a) to (d):

(a) water, (b) at least one compound selected from the group consisting of a polyoxyethylene polyoxypropylene alkyl ether and a polyoxyethylene polyoxypropylene copolymer, (c) at least one compound selected from the group consisting of nitric acid, nitrous acid, sulfuric acid, hydrochloric acid, molybdic acid, sulfamic acid, glycine, glyceric acid, mandelic acid, malonic acid, ascorbic acid, glutamic acid, glyoxylic acid, malic acid, glycolic acid, lactic acid, gluconic acid, succinic acid, tartaric acid, maleic acid and citric acid, and their salts, and (d) at least one abrasive selected from the group consisting of aluminum oxide, silicon dioxide, cerium oxide, zirconium oxide, titanium oxide, silicon nitride and silicon carbide.

5. The polishing method according to claim 4, wherein the component (c) is at least one member selected from the group consisting of aluminum nitrate, nickel nitrate, lithium nitrate, sodium nitrate, potassium nitrate, iron (III) nitrate, sodium nitrite, potassium nitrite, aluminum sulfate, nickel sulfate, lithium sulfate, sodium sulfate, iron (III) sulfate, ammonium sulfate, aluminum chloride, iron (III) chloride, ammonium chloride, sodium molybdate, ammonium molybdate, nickel sulfamate and ammonium sulfamate.

6. The polishing method according to claim 4, wherein the component (c) is at least one member selected from the group consisting of glycine, glyceric acid, mandelic acid, malonic acid, ascorbic acid, glutamic acid, glyoxylic acid, malic acid, glycolic acid, lactic acid, gluconic acid, succinic acid, tartaric acid, maleic acid and citric acid.

* * * * *